(12) United States Patent
Pandey et al.

(10) Patent No.: US 12,334,736 B2
(45) Date of Patent: Jun. 17, 2025

(54) POWER GRID MONITORING SYSTEM AND POWER GRID MONITORING METHOD

(71) Applicant: Hitachi, Ltd., Tokyo (JP)

(72) Inventors: Ravikant Pandey, Tokyo (JP); Daichi Kato, Tokyo (JP); Tohru Yoshihara, Tokyo (JP); Shinya Ohara, Tokyo (JP); Yutaka Kokai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 18/292,392

(22) PCT Filed: Aug. 1, 2022

(86) PCT No.: PCT/JP2022/029514
§ 371 (c)(1),
(2) Date: Jan. 26, 2024

(87) PCT Pub. No.: WO2023/032554
PCT Pub. Date: Mar. 9, 2023

(65) Prior Publication Data
US 2024/0348055 A1  Oct. 17, 2024

(30) Foreign Application Priority Data

Sep. 6, 2021 (JP) ................ 2021-145034

(51) Int. Cl.
*H02J 3/24* (2006.01)
*H02J 3/38* (2006.01)
(52) U.S. Cl.
CPC .............. *H02J 3/241* (2020.01); *H02J 3/381* (2013.01); *H02J 2300/28* (2020.01)
(58) Field of Classification Search
CPC ...... H02J 3/24; H02J 3/241; H02J 3/38; H02J 3/381; H02J 2300/25
See application file for complete search history.

(56) References Cited

U.S. PATENT DOCUMENTS 6,118,678 A    9/2000 Limpaecher et al.
9,941,828 B2   4/2018 Ren et al.
2014/0152331 A1  6/2014 Wagoner et al.

FOREIGN PATENT DOCUMENTS

CN    110867889 A    3/2020
JP    2003-502986 A   1/2003

OTHER PUBLICATIONS

International Search Report (PCT/ISA/210) issued in PCT Application No. PCT/JP2022/029514 dated Sep. 27, 2022 with English translation (4 pages).

(Continued)

*Primary Examiner* — Robert L Deberadinis
(74) *Attorney, Agent, or Firm* — Crowell & Moring LLP

(57) ABSTRACT

A power grid monitoring system includes a storage unit that stores power control system (PCS) impedance data indicative of a PCS impedance that is an impedance of a PCS-based energy source at a plurality of operation points, the PCS-based energy source being connected to an electric power system, the PCS-based energy source including a voltage source and a PCS that regulates power generated by the voltage source and supplies the power to the electric power system, a real time calculation unit that calculates a power grid impedance based on a power flow measured at a point of connection where the PCS-based energy source and the electric power system are connected to each other, the power grid impedance being an impedance of the electric power system, and a stability check unit that performs a stability check to detect low frequency oscillation (LFO) at the point of connection based on the PCS impedance data and the power grid impedance.

12 Claims, 16 Drawing Sheets

(56) References Cited

OTHER PUBLICATIONS

Japanese-language Written Opinion (PCT/ISA/237) issued in PCT Application No. PCT/JP2022/029514 dated Sep. 27, 2022 with English translation (6 pages).

POWER GRID MONITORING SYSTEM AND POWER GRID MONITORING METHOD

TECHNICAL FIELD

The present invention relates to a system and method for monitoring an electric power system.

BACKGROUND ART

In recent years, with increasing demand for power generation using clean renewable energy, it has been necessary for a power control system (PCS) to penetrate deeply in an electric power system. A PCS-based energy source including a certain type of renewable energy source and a generator using the PCS is connected to an electric power system at a point of connection (POC). In a real time operation of the electric power system, a PCS impedance and a power grid impedance at the POC are sufficient parameters for checking the stability of the electric power system.

In a case where any abnormality, such as a failure that results in the opening of a powerline, occurs at any point in the electric power system, the power grid impedance of the electric power system changes as a result. This change in the power grid impedance causes low frequency oscillation (LFO) in a voltage and current of the POC. In order to monitor and control the LFO in the electric power system, real time calculation of the power grid impedance and the PCS impedance is required. However, the calculation of the PCS impedance generally consumes a lot of time. Therefore, it is difficult to monitor the LFO in real time.

In a case where any abnormality occurs in the electric power system, the PCS-based energy source is vulnerable to the electric power system. One of the possible problems with PCS-based energy source is the LFO in a case where a short circuit ratio (SCR) of the electric power system is low. The SCR can be defined as the ratio of output power from the PCS-based energy source to the capacity of the powerline in the electric power system. Therefore, in a case where the output power from the PCS-based energy source is high and the transmission capacity of the powerline is low, the risk of LFO increases.

Wind energy is considered as one of the cleanest energy sources. Wind turbines that generate power using wind energy may be integrated with the electric power system via the PCS to be used as the PCS-based energy source. The function of the PCS is to adjust the variable characteristics of power and to supply the power to the electric power system.

A wind farm is a wind power plant including many wind turbines. The wind farm can be located at a remote place away from the main electric power system or a load center. Generally, a wind farm requires a long powerline led to the electric power system, and one POC. In the long powerline, series capacitors are regarded as an economic solution to address the problems of power grid stability, transmission capacity stability, and voltage stability.

In some examples, LFO is induced in the voltage and current at the POC in a case where the wind farm is radially connected to the series capacitors of the powerline because the wind turbine is vulnerable to sub-synchronous interaction problems. Specifically, the PCS may interact with electrical resonance generated by the series capacitor, and this might cause a damage or malfunction of the wind turbine. In the worst case, the PCS interaction may cause a power failure. Further, when a reaction to the LFO of the current produced by the electrical resonance occurs, the reaction can affect attenuation of resonance in the electric power system. This phenomenon is called a sub-synchronous control interaction (SSCI). The SSCI leads to LFO of a current and voltage and causes instability in the electric power system.

One commonly used method for investigating SSCI is frequency scan analysis. PTL 1 below discloses a frequency scanning method for calculating PCS impedances of a wind turbine and an electric power system for investigation of SSCI. In PTL 1, a PCS impedance and a power grid impedance are calculated to find a resonance frequency, which is the frequency of LFO of the system. By measuring the resistance of the system at the resonance frequency, a risk assessment of the LFO provided by the SSCI can be made. This impedance measurement method is used to improve the PCS controller of the wind turbine.

CITATION LIST

Patent Literature

PTL 1: U.S. Pat. No. 9,941,828

SUMMARY OF INVENTION

Technical Problem

In the method disclosed in PTL 1, the PCS impedance is calculated with an electromagnetic transient (EMT) model. Such calculation consumes a lot of time, and therefore it is still difficult to monitor the LFO in real time.

Therefore, an object of the present invention is to monitor LFO for a PCS-based energy source connected to an electric power system in real time.

Solution to Problem

A power grid monitoring system of the present invention includes a storage unit that stores power control system (PCS) impedance data indicative of a PCS impedance that is an impedance of a PCS-based energy source at a plurality of operation points, the PCS-based energy source being connected to an electric power system, the PCS-based energy source including a voltage source and a PCS that regulates power generated by the voltage source and supplies the power to the electric power system, a real time calculation unit that calculates a power grid impedance based on a power flow measured at a point of connection where the PCS-based energy source and the electric power system are connected to each other, the power grid impedance being an impedance of the electric power system, and a stability check unit that performs a stability check to detect low frequency oscillation (LFO) at the point of connection based on the PCS impedance data and the power grid impedance.

A power grid monitoring method of the present invention includes storing, in a storage device, power control system (PCS) impedance data indicative of a PCS impedance that is an impedance of a PCS-based energy source at a plurality of operation points, the PCS-based energy source being connected to an electric power system, the PCS-based energy source including a voltage source and a PCS that regulates power generated by the voltage source and supplies the power to the electric power system, calculating a power grid impedance, which is an impedance of the electric power system, based on a power flow measured at a point of connection where the PCS-based energy source and the electric power system are connected to each other, and performing a stability check for detecting low frequency oscillation (LFO) at the point of connection based on the PCS impedance data and the power grid impedance.

Advantageous Effects of Invention

According to the present invention, LFO for a PCS-based energy source connected to an electric power system can be monitored in real time.

DESCRIPTION OF EMBODIMENTS

First Embodiment

Figure 1:
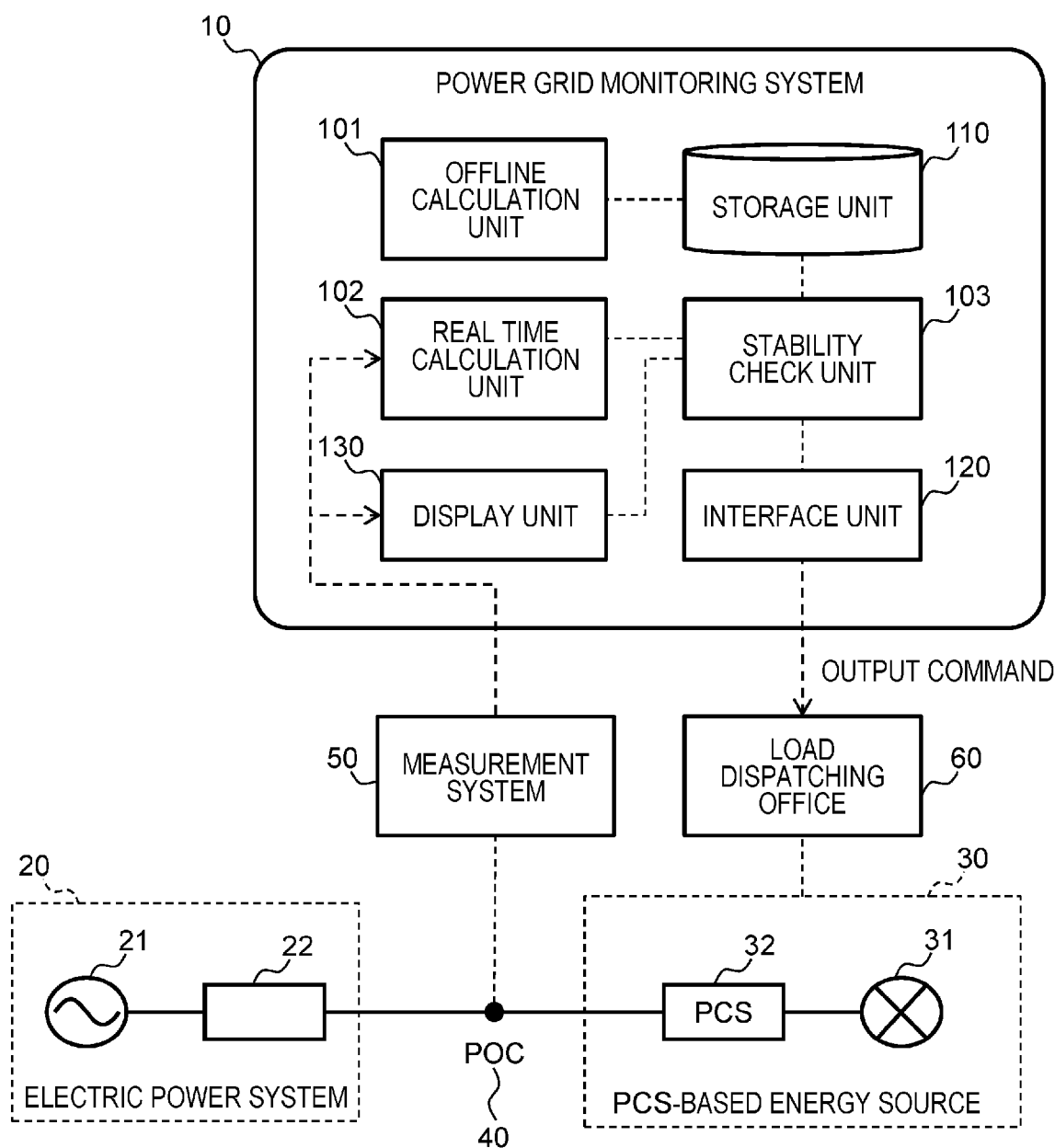
FIG. 1 is a schematic block diagram of a power grid monitoring system according to a first embodiment of the present invention.

FIG. 1 is a schematic block diagram of a power grid monitoring system 10 according to a first embodiment of the present invention. As illustrated in FIG. 1, the power grid monitoring system 10 is connected to an electric power system 20 and a power control system (PCS)-based energy source 30 via a measurement system 50 at a point of connection (POC) 40.

The electric power system 20 includes a generator 21 and a power grid impedance 22. The generator 21 generates power and supplies the power to a consumer via a powerline (not shown). The power grid impedance 22 is, for example, an impedance of the electric power system 20 including an inductance, a resistance, and a capacitance of the powerline.

The PCS-based energy source 30 includes a PCS voltage source 31 and a PCS 32. The PCS voltage source 31 is a generator using a renewable energy source such as wind power or solar power. The PCS 32 regulates power generated by the PCS voltage source 31 and supplies this power to a consumer via the powerline.

The electric power system 20 and the PCS-based energy source 30 are connected to each other at the POC 40. The measurement system 50, which is connected to the POC 40, measures a power flow at the POC 40 by repeatedly detecting a current and a voltage at a predetermined cycle, and outputs a measured result of the power flow to the power grid monitoring system 10.

The power grid monitoring system 10 includes an offline calculation unit 101, a real time calculation unit 102, a stability check unit 103, a storage unit 110, an interface unit 120, and a display unit 130.

The offline calculation unit 101 calculates the PCS impedance, which is an impedance value of the PCS 32, in advance in the frequency region at some operation points. Here, the operation point means output power from the PCS-based energy source 30, and varies depending on the active power, reactive power, and voltage at the POC 40. In other words, the offline calculation unit 101 calculates the PCS impedance for various output power from the PCS-based energy source 30 in advance. The PCS impedance data calculated by the offline calculation unit 101 is stored in the storage unit 101.

The real time calculation unit 102 calculates a power grid impedance, which is an impedance value of the power grid impedance 22, in a frequency region. The real time calculation unit 102 calculates the power grid impedance in real time based on the measured result of the power flow at the POC 40 output from the measurement system 50. The power grid impedance data calculated by the real time calculation unit 102 is output to the stability check unit 103.

The stability check unit 103 acquires the PCS impedance data stored in advance in the storage unit 110 and the power grid impedance data calculated in real time by the real time calculation unit 102, performs a stability check of the voltage and current at the POC 40 based on these data, and monitors generation of low frequency oscillation (LFO). As a result, in a case where the power flow at the POC 40 is likely to become unstable and the LFO may occur, the stability check unit 103 outputs a predetermined command to a load dispatching office 60 via the interface unit 120 in order to promote stabilization of the output power from the PCS-based energy source 30 to the electric power system 20.

The storage unit 110 stores various data used in the power grid monitoring system 10, such as the PCS impedance data calculated by the offline calculation unit 101. A non-volatile recording medium such as a hard disk drive (HDD) or a solid state drive (SSD) may be used as the storage unit 110.

The interface unit 120 performs predetermined interface processing for inputting and outputting signals of the power grid monitoring system 10. The above-described command from the stability check unit 103 can be output to the load dispatching office 60 by processing of the interface unit 120.

The display unit 130 receives the current and voltage at the POC 40 detected by the measurement system 50 and the result of the stability check by the stability check unit 103.

Based on these input data, the display unit 130 displays various information for monitoring the operation states of the electric power system 20 and the PCS-based energy source 30 for a user of the power grid monitoring system 10 such as a system administrator. An example of the image displayed on the display unit 130 will be described later.

In response to the output command from the stability check unit 103, the load dispatching office 60 changes the operation state of the PCS-based energy source 30 to facilitate stabilization of the output power from the PCS-based energy source 30 to the electric power system 20. This makes it possible to avoid occurrence of LFO at the POC 40.

Note that the power grid monitoring system 10 described in the first embodiment may include other stabilizing functions, such as voltage stability, frequency stability, and power flow control of the electric power system 20. Further, with respect to the electric power system 20, the generator 21 may include multiple generators, and the power grid impedance 22 may include a combination of interconnected series, parallel, and mesh-pattern powerlines. The electric power system 20 illustrated in FIG. 1 is merely an example.

Figure 2:
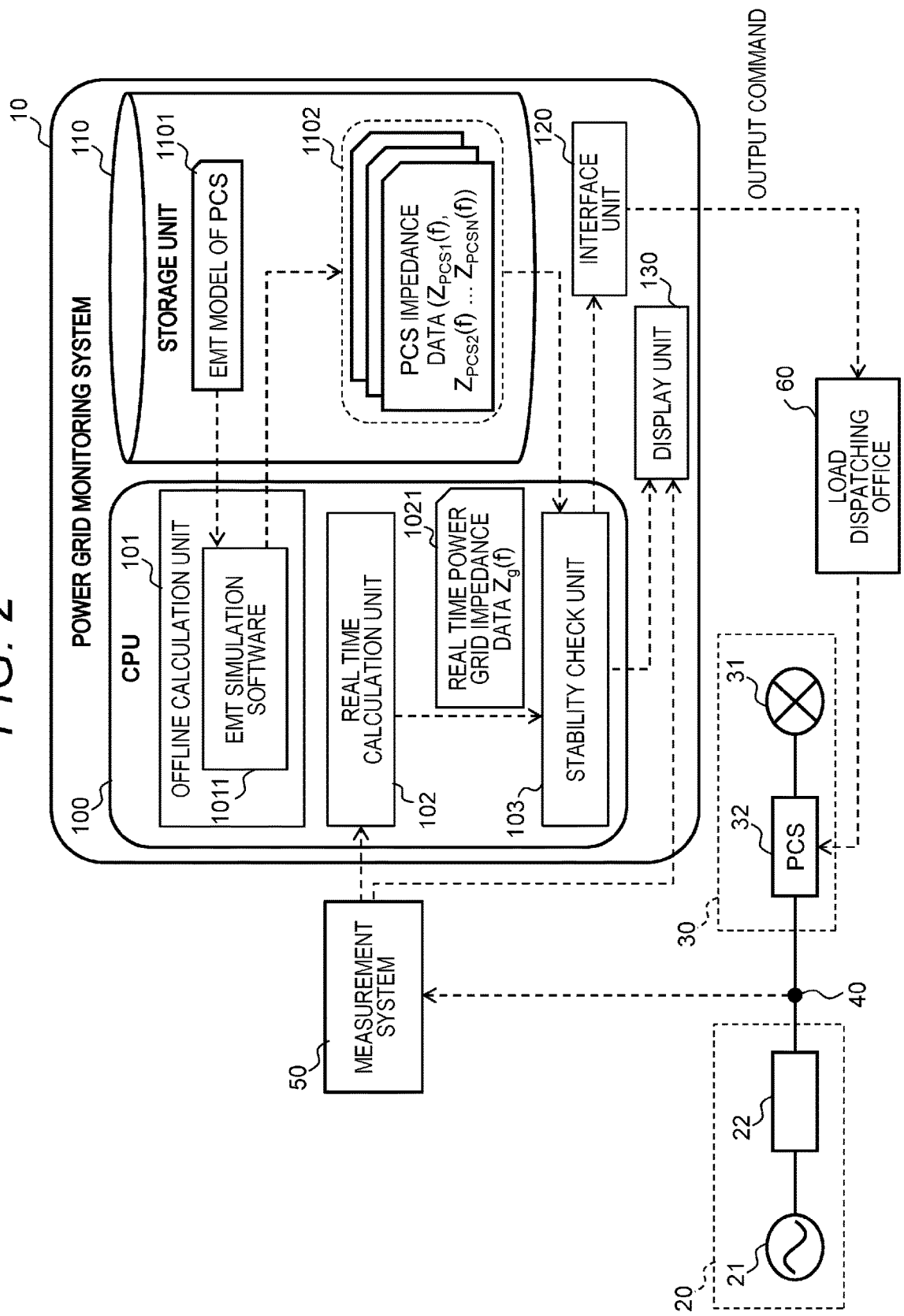
FIG. 2 illustrates a detailed configuration of the power grid monitoring system according to the first embodiment of the present invention.

FIG. 2 illustrates a detailed configuration of the power grid monitoring system 10 according to the first embodiment of the present invention. The power grid monitoring system 10 includes a central processing unit (CPU) 100 and the storage unit 110. The CPU 100 executes a program recorded in the storage unit 110 or the like to perform predetermined processing, and functions as the offline calculation unit 101, the real time calculation unit 102, and the stability check unit 103.

The offline calculation unit 101 reads an EMT model 1101 of the PCS, which is an electromagnetic transient model of the PCS-based energy source 30, from the storage unit 110. The offline calculation unit 101 executes EMT simulation software 1011 using the EMT model 1101 of the PCS to perform time-series simulation, and prepares a set of PCS impedance data $Z_{PCS1}(f)$, $Z_{PCS2}(f)$, ... $Z_{PCSN}(f)$ at several operation points 1, 2 ... N in the frequency region. The set of the PCS impedance data $Z_{PCS1}(f)$, $Z_{PCS2}(f)$, ... $Z_{PCSN}(f)$ calculated by the offline calculation unit 101 is stored in the storage unit 110 as PCS impedance data 1102.

The real time calculation unit 102 receives measurement results of the voltage and current flowing through the POC 40 from the measurement system 50, and calculates a power grid impedance $Z_g(f)$ in the frequency region based on the received voltage and current. The real time data 1021 of the calculated power grid impedance $Z_g(f)$ is output from the real time calculation unit 102 to the stability check unit 103.

The stability check unit 103 reads the PCS impedance data 1102 from the storage unit 110, and receives the real time power grid impedance data 1021 from the real time calculation unit 102. Based on these data, the stability check unit 103 performs a stability check for monitoring and controlling the LFO at the POC 40. Specific processing of the stability check performed by the stability check unit 103 will be described later. Then, the stability check unit 103 outputs a predetermined signal to the interface unit 120 as necessary. In response to the signal received from the stability check unit 103, the interface unit 120 outputs, to the load dispatching office 60, a command for stabilizing the output power from the PCS-based energy source 30 to the electric power system 20.

Figure 3:
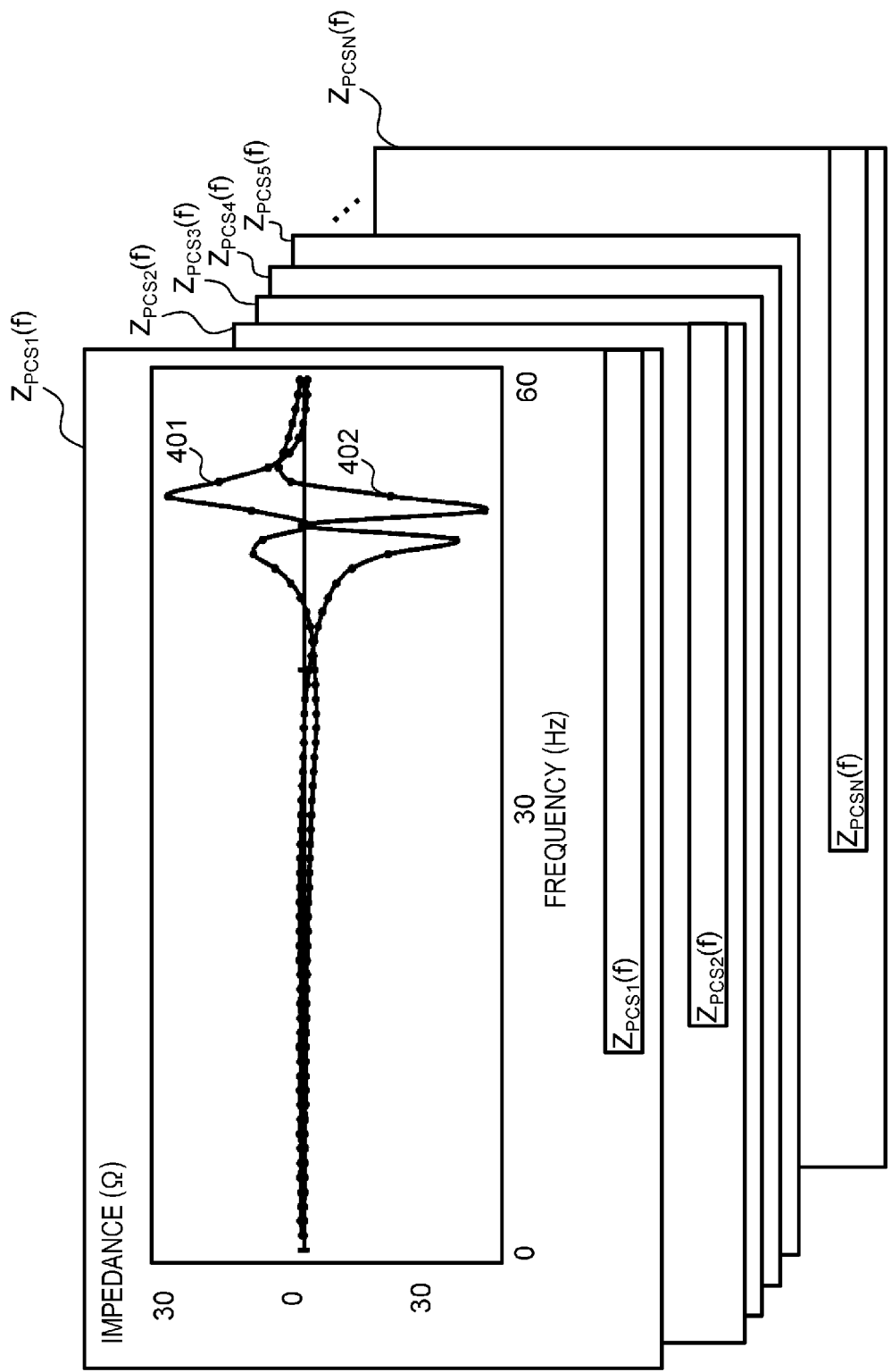
FIG. 3 illustrates an example of a set of impedance data of a power control system (POC) in a frequency region at several operation points.

FIG. 3 illustrates an example of the set of the PCS impedance data $Z_{PCS1}(f)$, $Z_{PCS2}(f)$, ... $Z_{PCSN}(f)$ in the frequency region at several operation points calculated by the offline calculation unit 101 to investigate a frequency range of 0 to 60 Hz. In order to search for a stable operation point of the electric power system 20 in a case where LFO occurs, the impedance of the PCS-based energy source 30 needs to be calculated at several operation points. In the present embodiment, as illustrated in FIG. 3, N pieces of PCS impedance data $Z_{PCS1}(f)$, $Z_{PCS2}(f)$, ... $Z_{PCSN}(f)$ for different operation points are calculated in the frequency region and stored in the storage unit 110 for use in monitoring and controlling the LFO. In FIG. 3, for example, as for the PCS impedance data $Z_{PCS1}(f)$, graphs 401 and 402 respectively show resistance and reactance of the PCS-based energy source 30 at a first operation point.

Figure 4A:
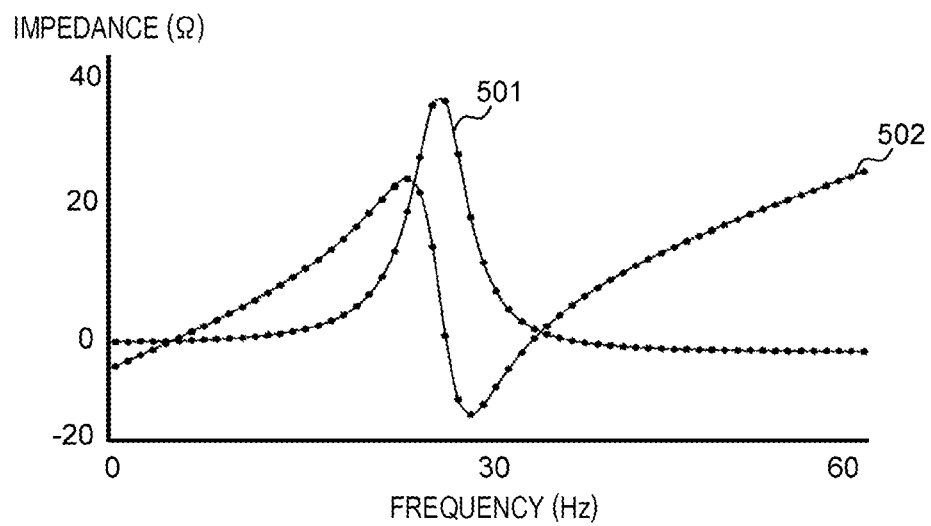
FIGS. 4A and 4B illustrate examples of a frequency region power grid impedance.
Figure 4B:
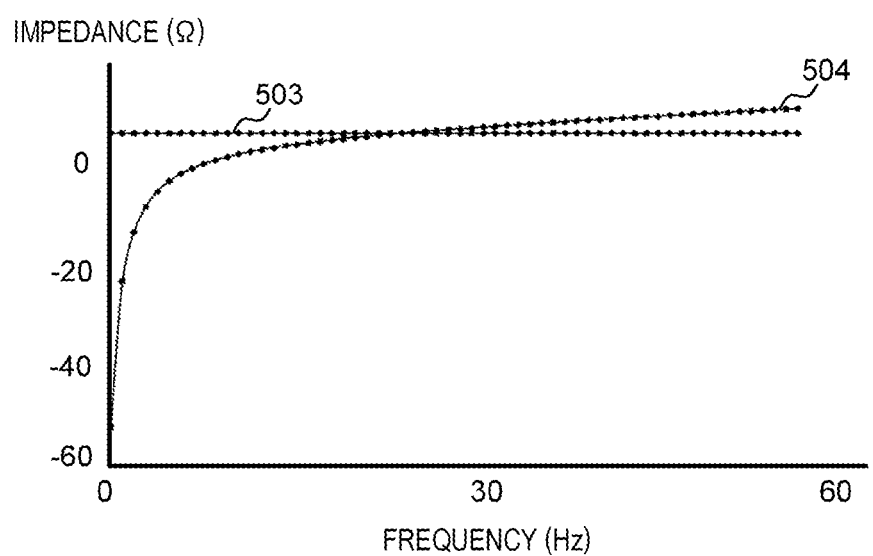

FIG. 4 illustrates an example of the power grid impedance $Z_g(f)$ in the frequency region calculated by the real time calculation unit 102. FIG. 4(a) illustrates an example of a power grid impedance $Z_{g1}(f)$ of the electric power system 20 before failure, and this is represented by graphs 501 and 502 respectively indicating the resistance and reactance of the electric power system 20 without abnormality. FIG. 4(b) illustrates an example of a power grid impedance $Z_{g2}(f)$ of the electric power system 20 before failure, and this is represented by graphs 503 and 504 respectively indicating the resistance and reactance of the electric power system 20 with the powerline having abnormality.

Figure 5:
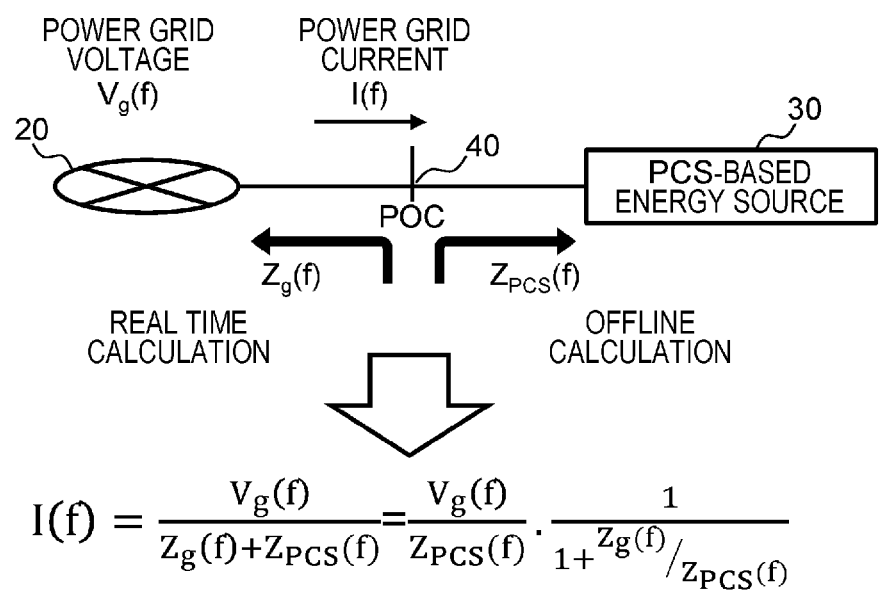
FIG. 5 illustrates an outline of a stability check process.

FIG. 5 illustrates an outline of a stability check process performed by the stability check unit 103. The power grid impedance $Z_g(f)$ calculated by the real time calculation unit 102 is transmitted to the stability check unit 103. The stability check unit 103 combines the power grid impedance $Z_g(f)$ with each of the PCS impedance data $Z_{PCS1}(f)$, $Z_{PCS2}(f)$, ... $Z_{PCSN}(f)$ to create transfer functions $Z_g(f)/Z_{PCS1}(f)$, $Z_g(f)/Z_{PCS2}(f)$, ... $Z_g(f)/Z_{PCSN}(f)$. In a case where an abnormality occurs in the electric power system 20, the power grid impedance $Z_g(f)$ calculated by the real time calculation unit 102 tends to change from $Z_{g1}(f)$ to $Z_{g2}(f)$ as illustrated in FIG. 4 due to a change in the power grid configuration in the electric power system 20. In this case, the stability check unit 103 can detect an abnormality by detecting a change in any of the transfer functions $Z_g(f)/Z_{PCS1}(f)$, $Z_g(f)/Z_{PCS2}(f)$, ... $Z_g(f)/Z_{PCSN}(f)$. The stability check process described above is performed by the stability check unit 103.

As illustrated in FIG. 5, a power grid current I(f) and a power grid voltage Vg(f) of the electric power system 20 can be acquired by measuring the power flow at the POC 40 and deriving a closed-loop transfer function represented by equation 1.

[Mathematical Equation 1]

$$I(f) = \frac{y_g(f)}{Z_g(f) + Z_{PCS}(f)} = \frac{V_g(f)}{Z_{PCS}(f)} \cdot \frac{1}{1 + Z_g(f)/Z_{PCS}(f)} \quad (1)$$

By creating a Bode diagram of the transfer function $Z_g(f)/Z_{PCS}(f)$, the stability of the system can be determined. In other words, the detection and control of the LFO can be performed. A flowchart of the stability check process performed by the stability check unit 103 will be described in the next section.

Figure 6:
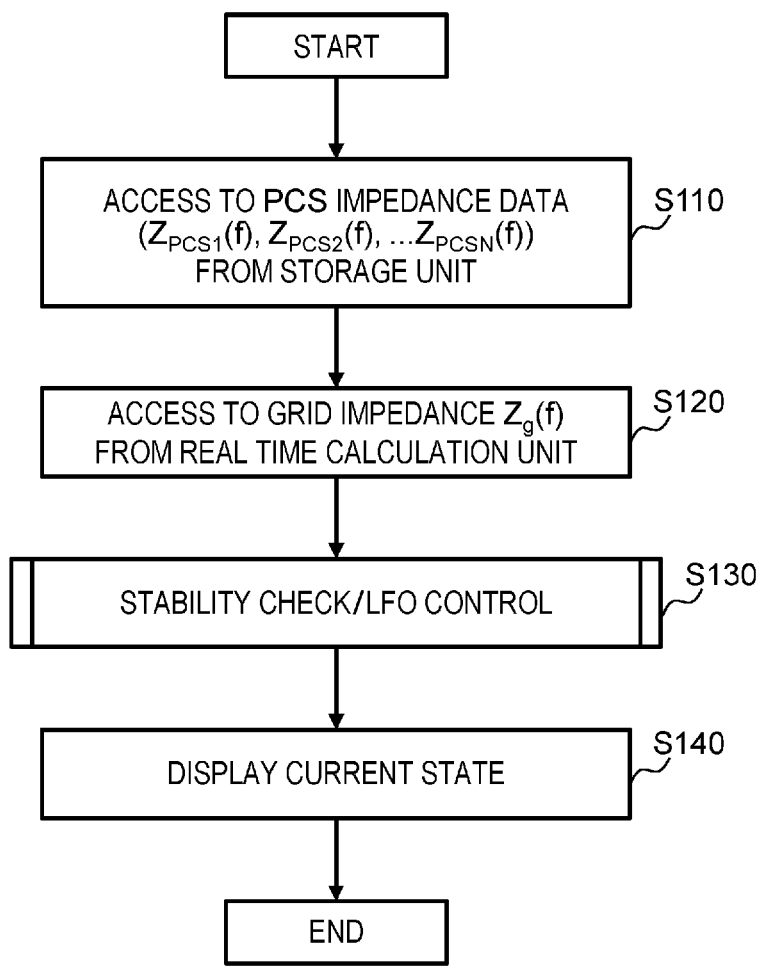
FIG. 6 illustrates a flowchart of the stability check process.

FIG. 6 illustrates a flowchart of the stability check process performed by the stability check unit 103. Processing illustrated in the flowchart of FIG. 6 is executed in a predetermined cycle by, for example, the CPU 100 functioning as the stability check unit 103 of the power grid monitoring system 10 illustrated in FIG. 2.

In step S110, the stability check unit 103 accesses to the PCS impedance data $Z_{PCS1}(f)$, $Z_{PCS2}(f)$, ... $Z_{PCSN}(f)$ in the frequency region from the storage unit 110. Here, N represents the number of operation points where the PCS impedance data is calculated in advance by the offline calculation unit 101.

In step S120, the stability check unit 103 accesses to the power grid impedance $Z_g(f)$ in the frequency region from the real time calculation unit 102. The power grid impedance $Z_g(f)$ is calculated in real time by the real time calculation unit 102 based on the power flow at the POC 40 measured by the measurement system 50.

In step S130, the stability check unit 103 performs stability check and LFO control based on the PCS impedance data $Z_{PCS1}(f), Z_{PCS2}(f), \ldots, Z_{PCSN}(f)$ acquired in step S110 and the power grid impedance $Z_g(f)$ acquired in step S120. Detailed processing in step S130 will be described in the following section with reference to FIG. 7.

In step S140, the stability check unit 103 outputs a result of the stability check performed in step S130 to the display unit 130. Based on the result of the stability check from the stability check unit 103, the display unit 130 displays the current state of the electric power system 20 and the PCS-based energy source 30. An example of the screen displayed in step S140 will be described later.

After the processing in step S140 is performed, the stability check unit 103 ends the stability check process illustrated in FIG. 6.

Figure 7:
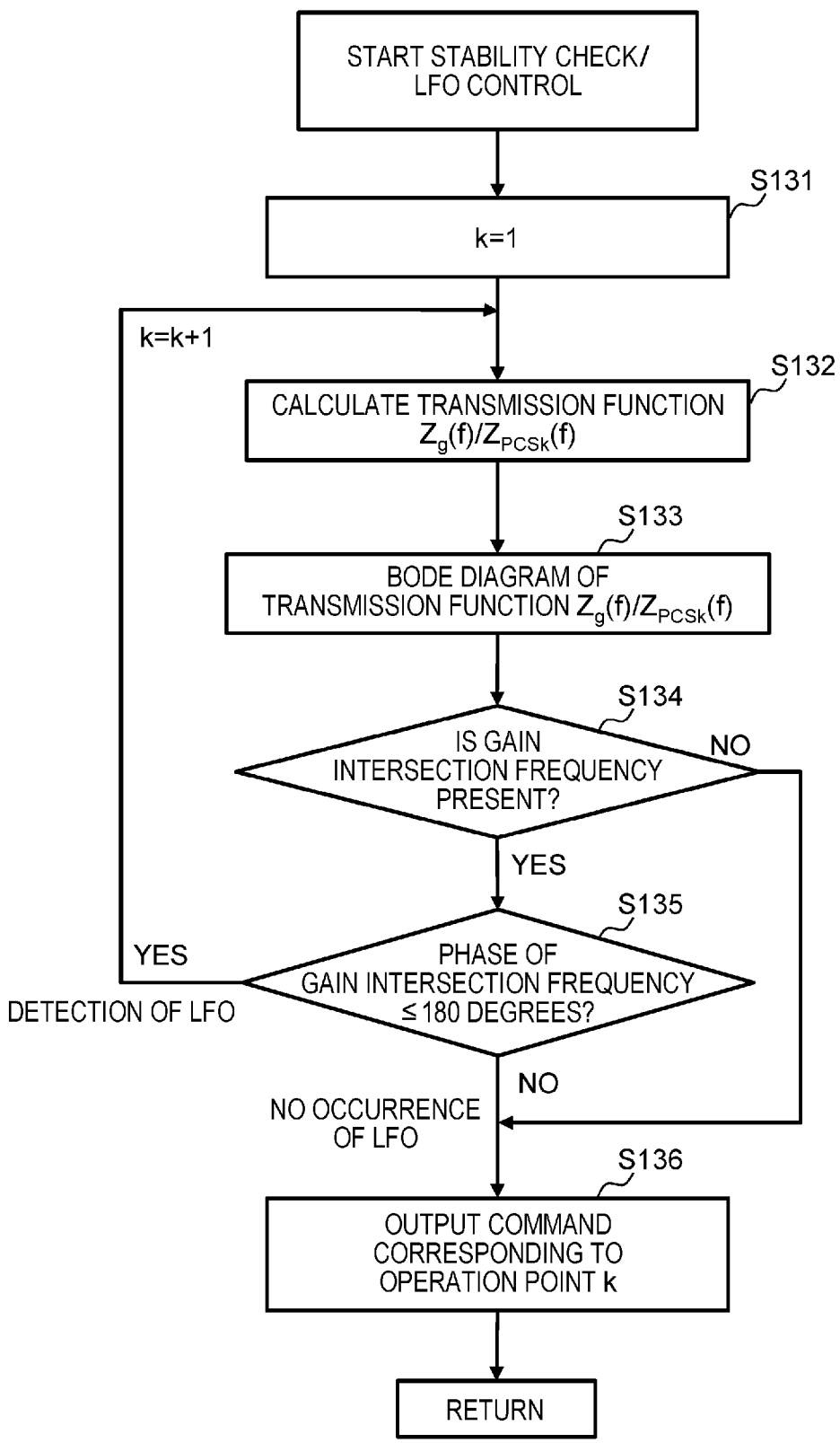
FIG. 7 illustrates a flowchart of a stability check and low frequency oscillation (LFO) control performed in step S130 of FIG. 6.

FIG. 7 illustrates a flowchart of the stability check and LFO control performed in step S130 of FIG. 6.

In step S131, the stability check unit 103 sets a variable k as k=1.

In step S132, the stability check unit 103 calculates a transfer function $Z_g(f)/Z_{PCSk}(f)$ for the current value k based on the PCS impedance data $Z_{PCSk}(f)$ in the frequency region and the power grid impedance $Z_g(f)$ in the frequency region respectively acquired in steps S110 and S120 of FIG. 6. Note that the value k is counted up one by one from the initial value 1 to the final value N during loop processing from step S132 to step S135. As described as for the transfer function of Equation 1, the transfer function $Z_g(f)/Z_{PCSk}(f)$ is sequentially calculated in step S132 for the operation points k=1, 2, 3 ... N. The operating points k=1, 2, 3 ... N correspond respectively to the output power $P_1, P_2, P_3, \ldots P_n$ of the PCS-based energy source 30, the reactive power $Q_1, Q_2, Q_3, \ldots Q_n$ of the PCS-based energy source 30, and the voltage amplitudes $V_1, V_2, V_3, \ldots V_N$ at the POC 40.

In step S133, the stability check unit 103 creates a Bode diagram of the transfer function $Z_g(f)/Z_{PCSk}(f)$ calculated in step S132. Here, the equation k=1 corresponds to the current operation point of the PCS-based energy source 30. An example of the Bode diagram created in step S133 will be described later.

In step S134, the stability check unit 103 determines whether a gain intersection frequency is present in the Bode diagram created in step S133. The gain intersection frequency means a frequency at which the gain of the transfer function $Z_g(f)/Z_{PCSk}(f)$ becomes 0 dB. In a case where a determination is made that a gain intersection frequency is present in the Bode diagram, the processing proceeds from step S134 to step S135, whereas in a case where a determination is made that no gain intersection frequency is present, the processing proceeds to step S136.

In step S135, the stability check unit 103 determines whether a phase angle of the transfer function $Z_g(f)/Z_{PCSk}(f)$ at the gain intersection frequency detected in the Bode diagram in step S134 is less than −180 degrees. In a case where a determination is made that the phase angle is less than −180 degrees, in other words in a case where a determination is made that LFO has occurred for the current value k, the value k is counted up and the processing returns to step S132 to check a transfer function at the next operation point k=k+1. On the other hand, in a case where a determination is made that the phase angle is not less than −180 degrees, the processing proceeds to step S136.

The loop processing from step S132 to step S135 is repeatedly executed until a determination is made in step S134 that no gain intersection frequency is present or a determination is made in step S135 that the gain intersection frequency is −180 degrees or more. As a result, the operation point k where the LFO does not occur can be specified.

In step S136, the stability check unit 103 outputs a command corresponding to the operation point k where the determination is made that no gain intersection frequency is present or the gain intersection frequency is −180 degrees or more. The command output from the stability check unit 103 is transferred to the load dispatching office 60 via the interface unit 103. In response to this command, the load dispatching office 60 causes the PCS-based energy source 30 to stabilize the output power.

After the processing in step S136 is performed, the stability check unit 103 ends the stability check and the LFO control illustrated in FIG. 7, returns to FIG. 6, and proceeds to a next step S140.

By performing the above-described processing in the stability check unit 103 in step S130, the stability check and the LFO control can be implemented.

Note that, in the above-described embodiment, the method of the stability check process using the Bode diagram has been described. However, the power grid monitoring system 10 may use another control theory or method for monitoring the LFO using Equation 1 based on the power grid impedance $Z_g(f)$ in the frequency region and the frequency region PCS impedance $Z_{PCS}(f)$ at some operation points where the LFO is monitored.

Figure 8:
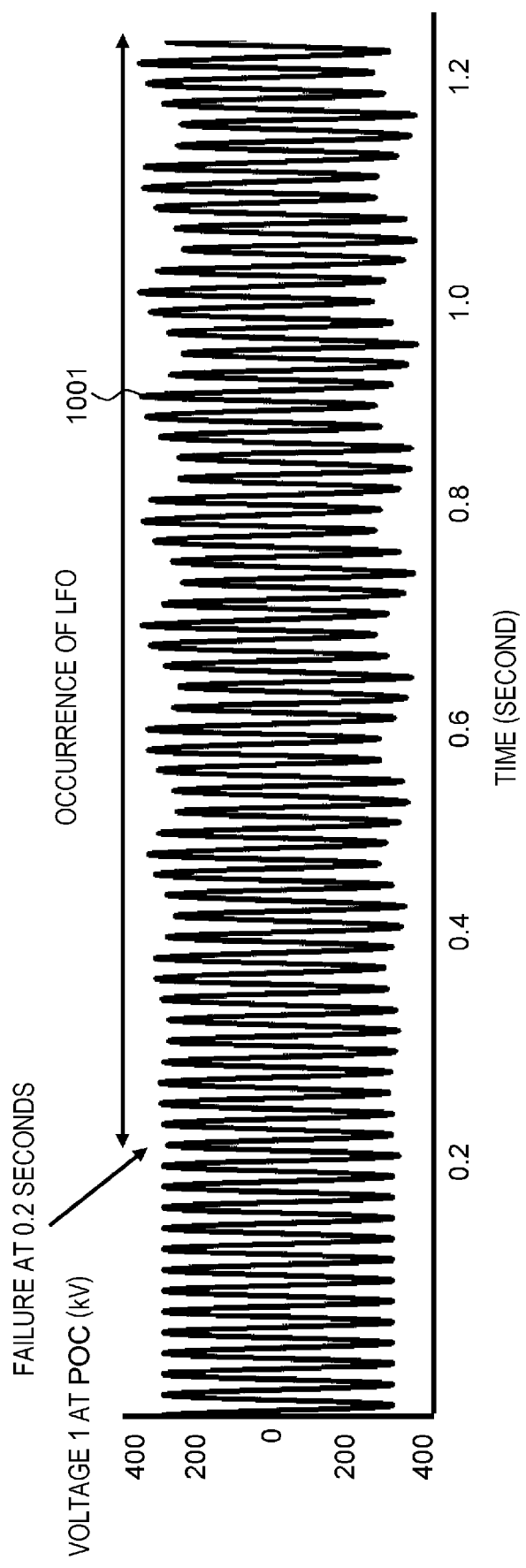
FIG. 8 is an example of voltage behavior in time series at a point of connection (POC) in a case where the LFO control is not applied.

FIG. 8 is an example of voltage behavior in time series at the POC 40 in a case where the LFO control is not applied. In FIG. 8, a graph 1001 shows a voltage at the POC 40 measured by measurement system 50. As shown in the graph 1001, the voltage at the POC 40 is stable between t=0 and t=0.2 seconds, and a stable operation is performed in the PCS-based energy source 30 due to an operation point k=1 corresponding to the certain active power output $P_1$, reactive power output $Q_1$, and voltage amplitude $V_1$. During this time, the PCS impedance $Z_{PCS}(f)$ in a frequency region before failure is given by $Z_{PCS1}(f)$, and the power grid impedance $Z_g(f)$ in the frequency region is given by $Z_{g1}(f)$.

Then, when t=0.2 seconds, it is assumed that a line opening failure occurs in the electric power system 20, and the power grid impedance $Z_g(f)$ in the frequency region changes from $Z_{g1}(f)$ to $Z_{g2}(f)$. After this failure, the voltage amplitude at the POC 40 fluctuates as shown in the graph 1001, and this indicates that LFO occurs in the voltage at the POC 40.

Figure 9:
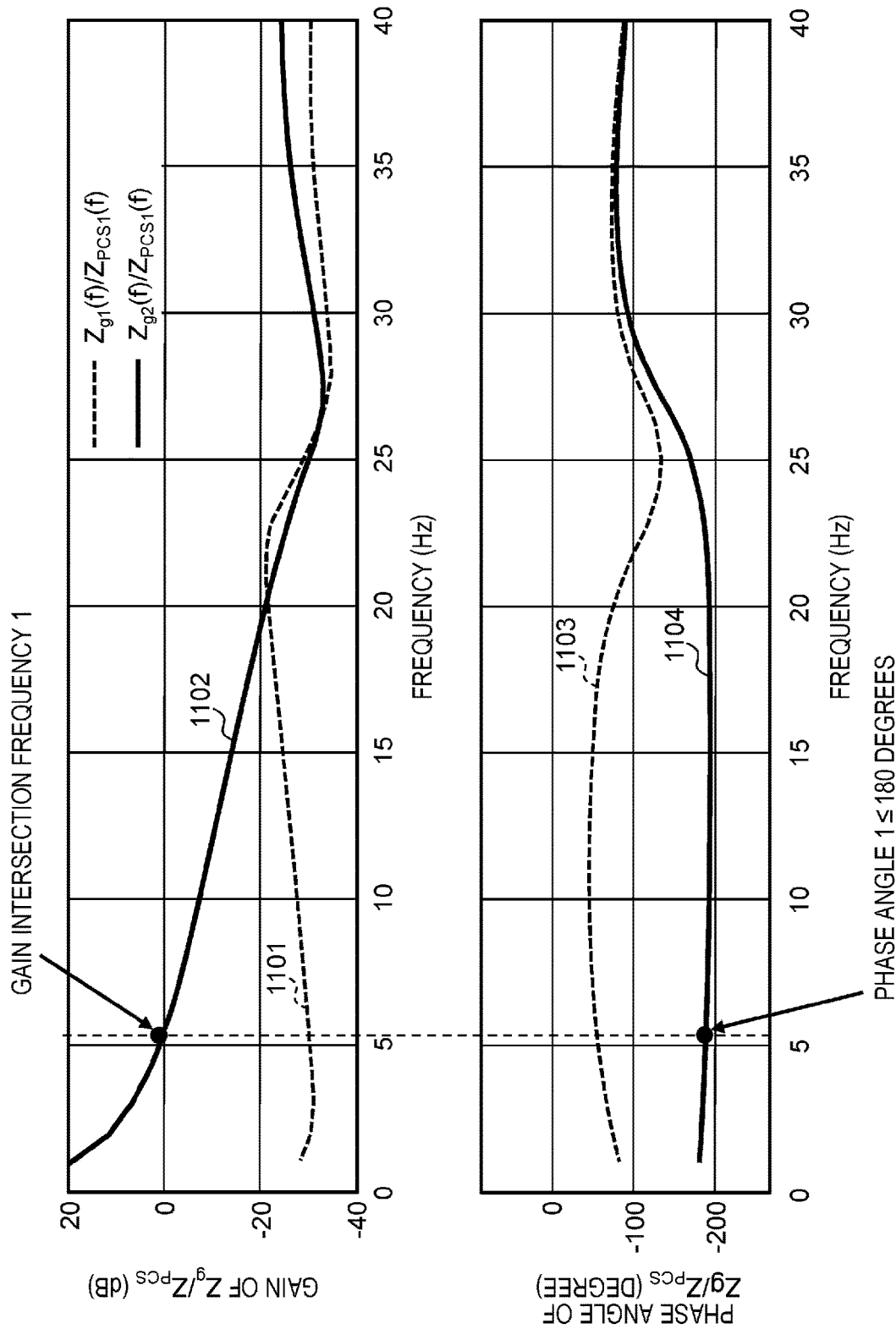
FIG. 9 illustrates an example of a Bode diagram of a transfer function in accordance with a voltage at the POC illustrated in the example of FIG. 8.

FIG. 9 illustrates an example of a Bode diagram of the transfer function $Z_g(f)/Z_{PCS}(f)$ in accordance with a voltage at the POC 40 illustrated in the example of FIG. 8. In FIG. 9, graphs 1101 and 1103 respectively show the gain and phase angle of a transfer function $Z_{g1}(f)/Z_{PCS1}(f)$ before the failure, and graphs 1102 and 1104 respectively show the gain and phase angle of a transfer function $Z_{g2}(f)/Z_{PCS2}(f)$ after the fault.

As illustrated in FIG. 9, the graph 1101 has no gain intersection frequency at which the gain is 0 dB, and the graph 1103 has no portion where the phase angle is less than −180 degrees. Therefore, no LFO occurs and the transfer function $Z_{g1}(f)/Z_{PCS1}(f)$ before failure at the operation point k being 1 is stable. However, due to the occurrence of LFO, a gain intersection frequency at which the gain is 0 dB is present in the graph 1102, and the phase angle at the gain intersection frequency is less than −180 degrees in the graph 1104.

Figure 10:
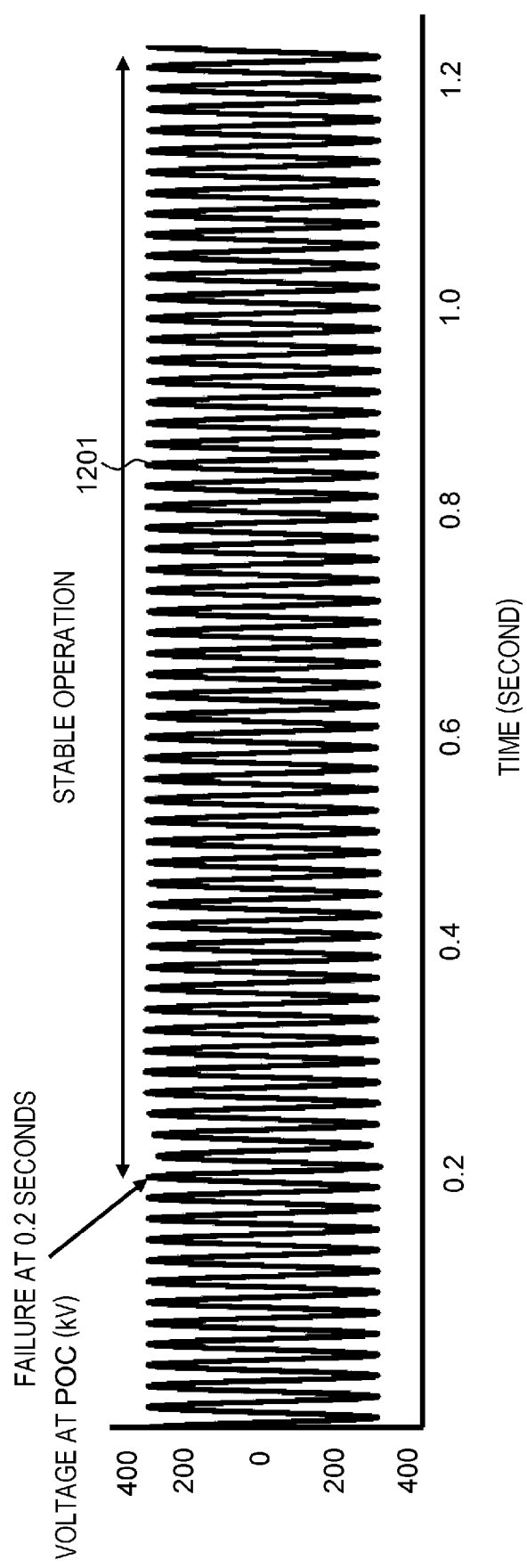
FIG. 10 illustrates an example of voltage behavior in time series at the POC in a case where the LFO control of the present invention is applied.

FIG. 10 illustrates an example of voltage behavior in time series at the POC 40 in a case where the LFO control of the present invention is applied. In FIG. 10, a graph 1201 shows a voltage at the POC 40 measured by measurement system 50. As shown in the graph 1201, by changing the operation point k is changed from 1 to another value that enables a stable operation after failure, the voltage at the POC 40 can be maintained in a stable state after t is 0.2 seconds.

Figure 11:
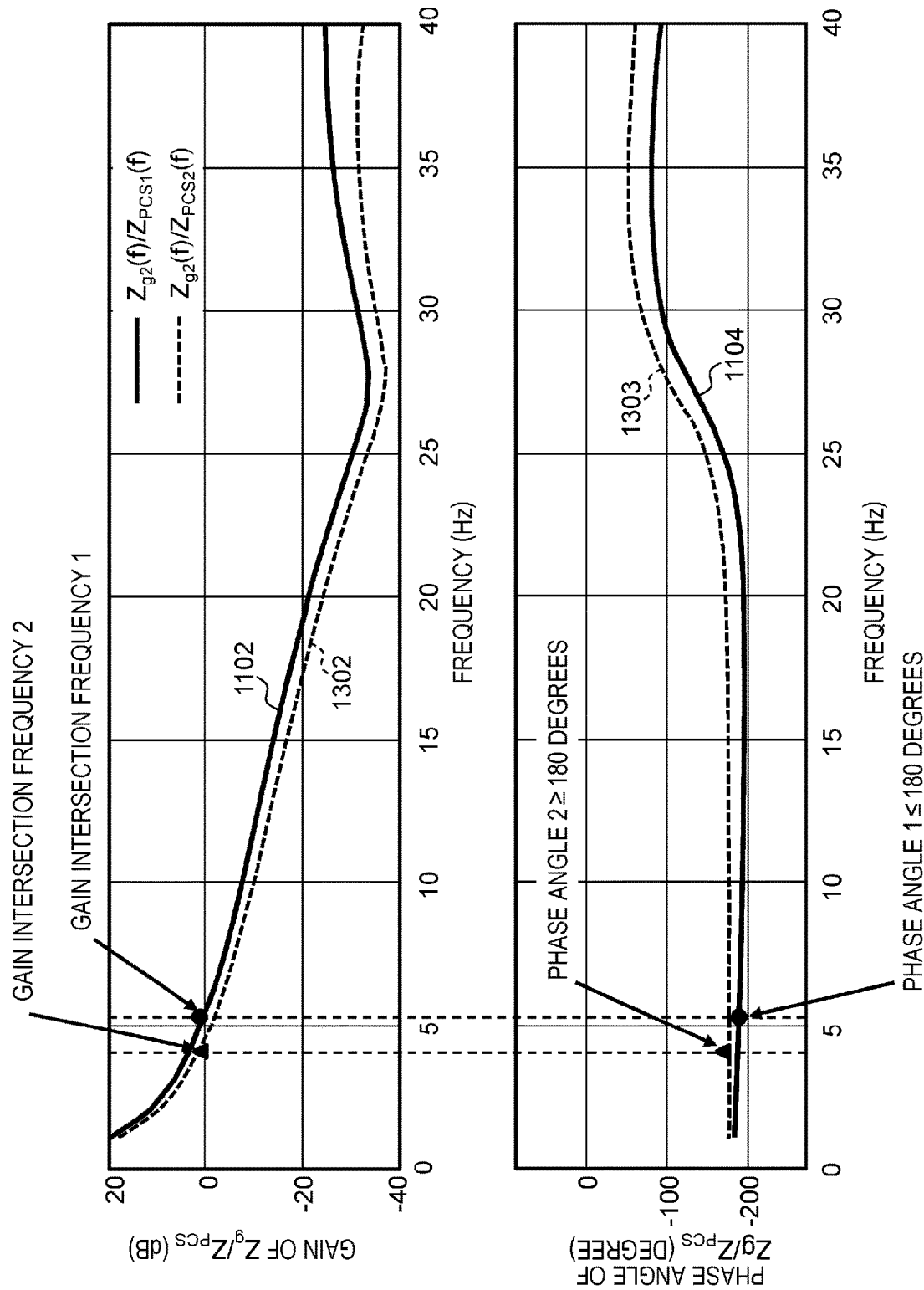
FIG. 11 illustrates an example of a Bode diagram of a transfer function in accordance with a voltage at the POC illustrated in the example of FIG. 10.

FIG. 11 illustrates an example of a Bode diagram of the transfer function $Z_g(f)/Z_{PCS}(f)$ in accordance with a voltage at the POC 40 illustrated in the example of FIG. 10. In FIG. 11, graphs 1302 and 1303 respectively show the gain and phase angle of the transfer function $Z_{g2}(f)/Z_{PCS2}(f)$ after failure in a case where the LFO control is applied. Note that the graphs 1102 and 1104 are identical to those illustrated in FIG. 9.

As illustrated in FIG. 11, the gain intersection frequency of the graph 1102 and the gain intersection frequency of the graph 1302 are clearly different from each other. Further, the phase angle of the graph 1104 is clearly less than −180 degrees representing an unstable operation point, whereas the phase angle of the graph 1303 is clearly greater than −180 degrees. Thus, it is understood that the transfer function $Z_{g2}(f)/Z_{PCS2}(f)$ after the change of the operation point in according to the present invention is stable.

As described above, by applying the present invention to the power grid monitoring system 10, in a case where LFO is detected at the current operation point k being 1, the PCS-based energy source 30 can be controlled so that its operation point is changed from the current operation point to another stable operation point where no LFO is detected. The changed operation point corresponds to the active power output $P_2$, the reactive power output $Q_2$, and the voltage amplitude $V_2$. Therefore, the PCS impedance $Z_{PCS2}(f)$ in the frequency region can be changed so that the transfer function $Z_{g2}(f)/Z_{PCS2}(f)$ after failure is stabilized.

Figure 12:
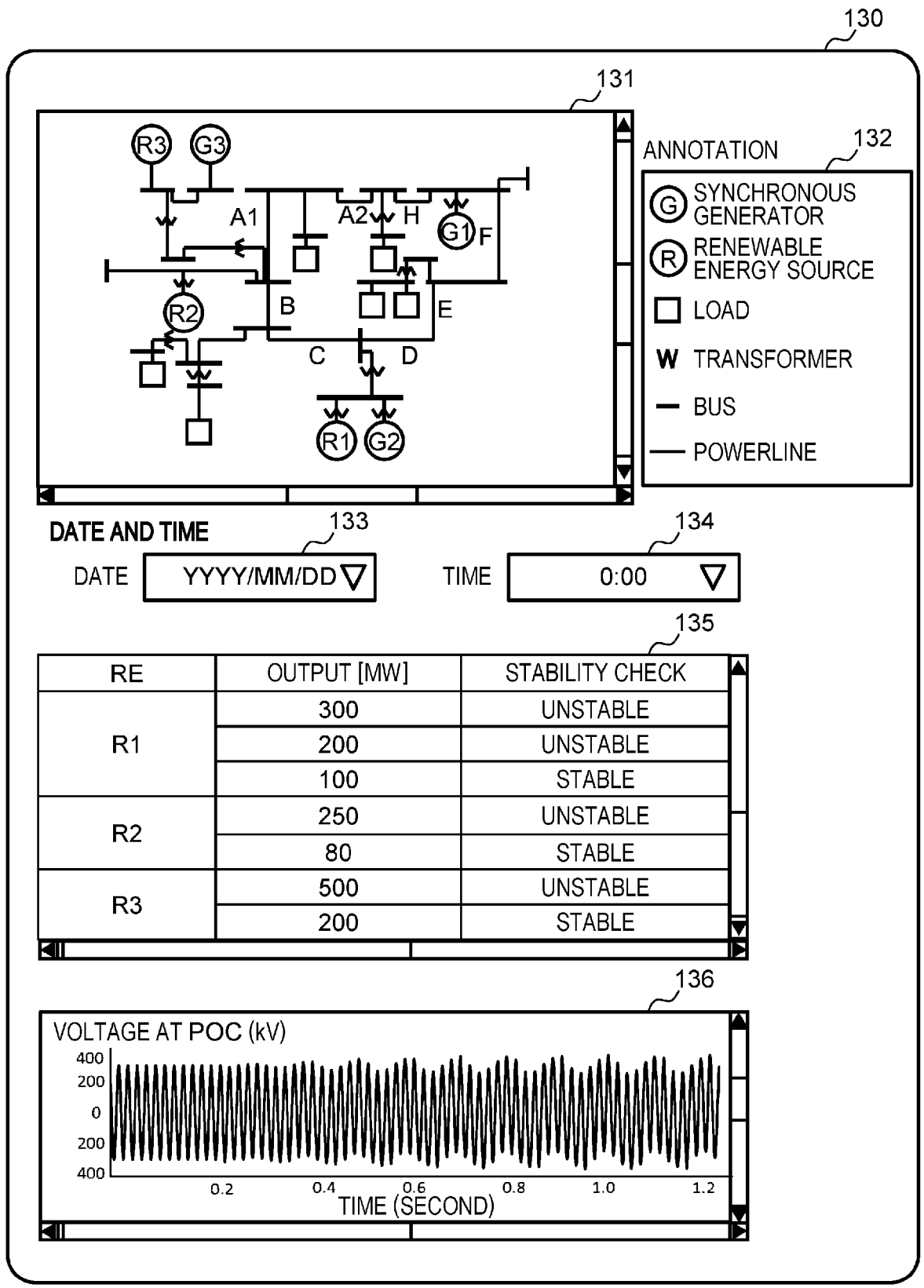
FIG. 12 illustrates an example of a screen displayed on a display unit.

FIG. 12 illustrates an example of a screen displayed on the display unit 130 in step S140. This screen includes a plurality of display frames 131 to 136. The display frame 131 shows the configuration of the electric power system 20 and the PCS-based energy source 30. The display frame 132 shows notes of symbols used in the display frame 131. The display frames 133 and 134 show date and time. The display frame 135 shows the output power and stability check results for the renewable energy source respectively included in the PCS-based energy source 30 as the PCS voltage source 31. The display frame 136 shows a waveform of the voltage at the POC 40.

According to the first embodiment of the present invention described above, the following operational effects can be obtained.

(1) The power grid monitoring system 10 includes the storage unit 110, the real time calculation unit 102, and the stability check unit 103. The storage unit 110 stores PCS impedance data 1102 indicating the PCS impedances $Z_{PCS1}(f), Z_{PCS2}(f), \ldots, Z_{PCSN}(f)$, which are impedances of the PCS-based energy source 30 at the plurality of operation points k being 1, 2, 3 ... N. The PCS-based energy source 30 is connected to the electric power system 20 and includes the PCS voltage source 31 and the PCS 32 that regulates and provides power generated by the PCS voltage source 31 to the electric power system 20. The real time calculation unit 21 calculates the power grid impedance $Z_g(f)$, which is the impedance of the electric power system 20, based on the power flow measured at the point of connection (POC) 40 where the PCS-based energy source 30 and the electric power system 20 are connected to each other. The stability check unit 103 performs a stability check for detecting LFO at the POC 40 based on the PCS impedance data 1102 and the power grid impedance $Z_g(f)$. According to this configuration, LFO for the PCS-based energy source 30 connected to the electric power system 20 can be monitored in real time.

(2) The storage unit 110 stores the PCS impedance data 1102 indicating the PCS impedances $Z_{PCS1}(f), Z_{PCS2}(f), \ldots, Z_{PCSN}(f)$ in the frequency region, and the real time calculation unit 102 calculates the power grid impedance $Z_g(f)$ in the frequency region. In this way, LFO in the frequency region can be accurately monitored.

(3) The stability check unit 103 creates a Bode diagram using the PCS impedance data 1102 and the power grid impedance $Z_g(f)$ in the frequency region (steps S132 and S133). The Bode diagram includes the gain and phase angle of the transfer function $Z_g(f)/Z_{PCSk}(f)$ between the PCS-based energy source 30 and the electric power system 20 at the POC 40 for each of the plurality of operation points k being 1, 2, 3 ... N, as illustrated in FIGS. 9 and 11. The stability check unit 103 determines whether LFO is detected based on the Bode diagram (steps S134 and S135). This makes it possible to detect the operation point of the PCS-based energy source 30 where a stable operation can be performed without occurrence of LFO at the POC 40.

(4) The power grid monitoring system 10 further includes the offline calculation unit 101 that calculates the impedance of the PCS-based energy source 30. The storage unit 110 stores the PCS impedance data $Z_{PCS1}(f), Z_{PCS2}(f), \ldots Z_{PCSN}(f)$ generated based on the impedance of the PCS-based energy source 30 calculated by the offline calculation unit 101. With this configuration, the PCS impedance data $Z_{PCS1}(f), Z_{PCS2}(f), \ldots Z_{PCSN}(f)$ can be calculated in advance by the offline calculation unit 101 and stored in the storage unit 110.

(5) In a case where LFO is detected for the current operation point k being 1, the stability check unit 103 outputs a command for changing the operation condition of the PCS-based energy source 30 from the current operation point to another operation point among the plurality of operation points k being 1, 2, 3 ... N (step S136). In this way, the PCS impedance can be changed so that the transfer function $Z_{g2}(f)/Z_{PCS2}(f)$ after failure is stabilized.

Second Embodiment

Figure 13:
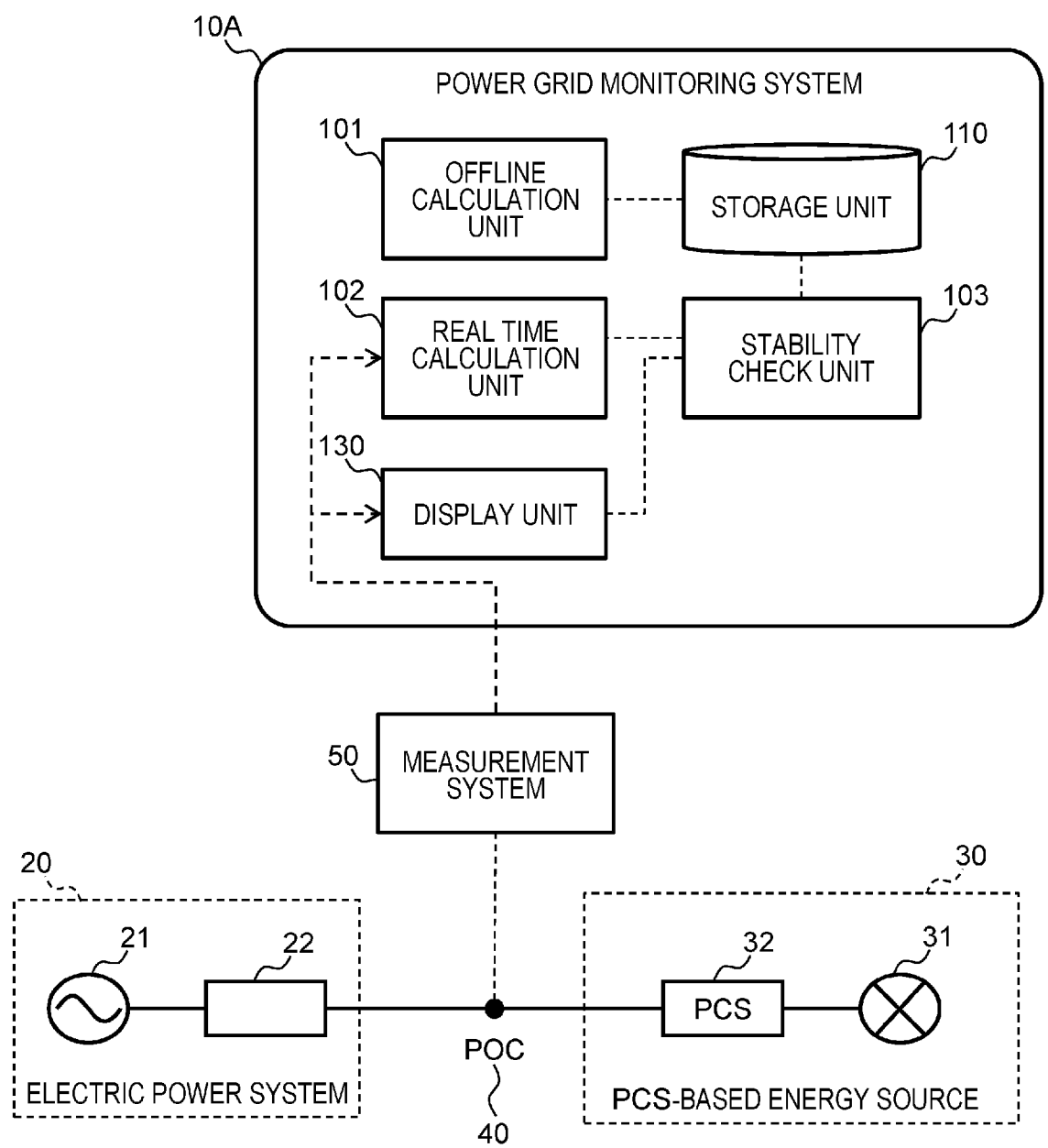
FIG. 13 is a schematic block diagram of a power grid monitoring system according to a second embodiment of the present invention.

FIG. 13 is a schematic block diagram of a power grid monitoring system 10A according to a second embodiment of the present invention. The power grid monitoring system 10A is different from the power grid monitoring system 10 according to the first embodiment illustrated in FIG. 1 in that the interface unit 120 is not provided and is not connected to the load dispatching office 60.

In the power grid monitoring system 10A, the stability check unit 103 monitors the occurrence of LFO at the POC 40 by performing the stability check as described in the first embodiment, and causes the display unit 130 to display the result of the stability check in a case where LFO is detected.

According to the second embodiment of the invention described above, as in the first embodiment, LFO can be monitored in real time for the PCS-based energy source 30 connected to the electric power system 20.

Third Embodiment

Figure 14:
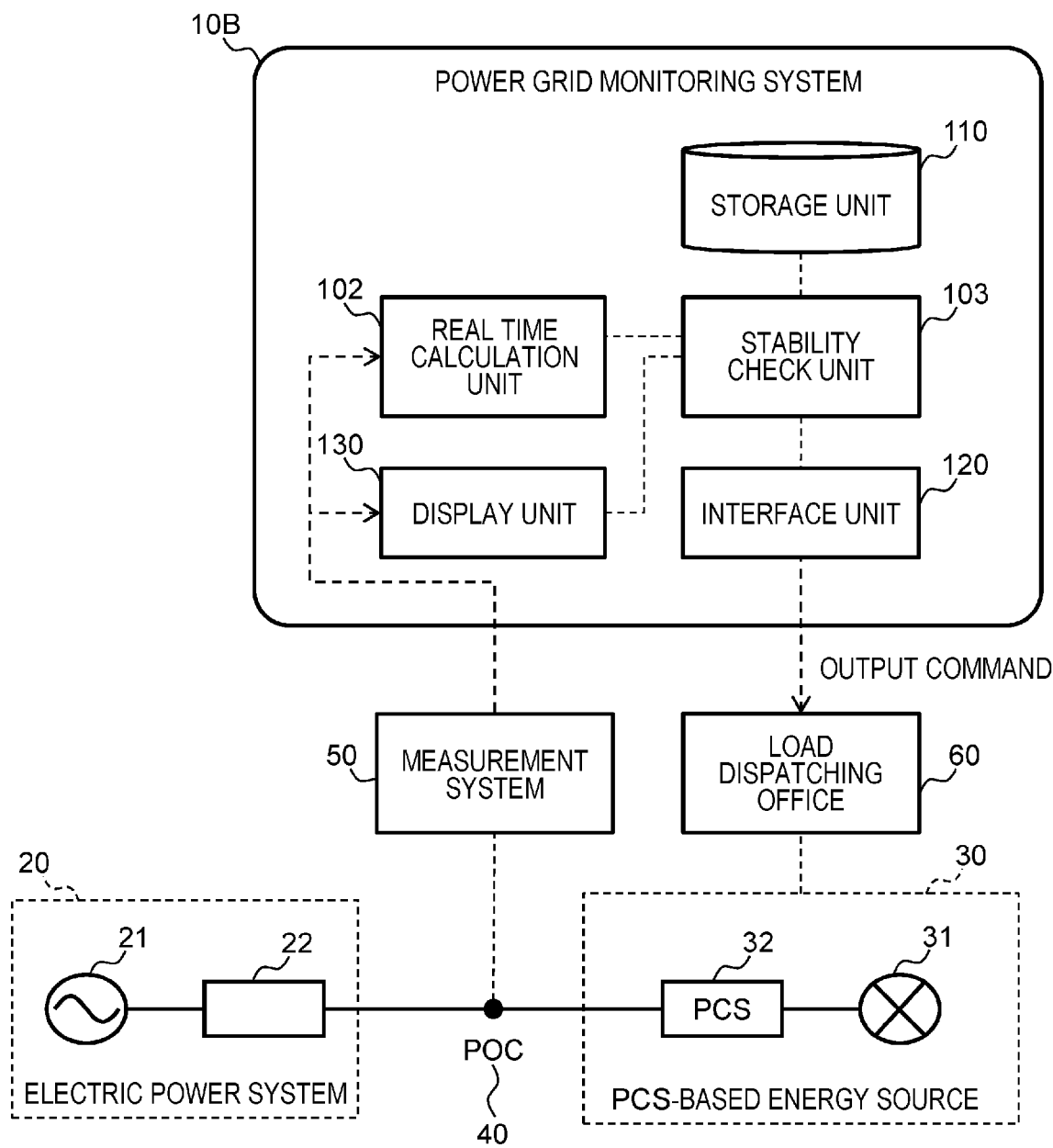
FIG. 14 is a schematic block diagram of a power grid monitoring system according to a third embodiment of the present invention.

FIG. 14 is a schematic block diagram of a power grid monitoring system 10B according to a third embodiment of the present invention. The power grid monitoring system 10B is different from the power grid monitoring system 10 according to the first embodiment illustrated in FIG. 1 in that the offline calculation unit 101 is not provided.

In the power grid monitoring system 10B, the PCS impedance data 1102 is calculated in advance by a computer (not illustrated) and stored in the storage unit 110.

According to the third embodiment of the invention described above, as in the first embodiment, LFO can be monitored in real time for the PCS-based energy source 30 connected to the electric power system 20. Further, the configuration of the power grid monitoring system 10B can be simplified by omitting the offline calculation unit 101.

Fourth Embodiment

Figure 15:
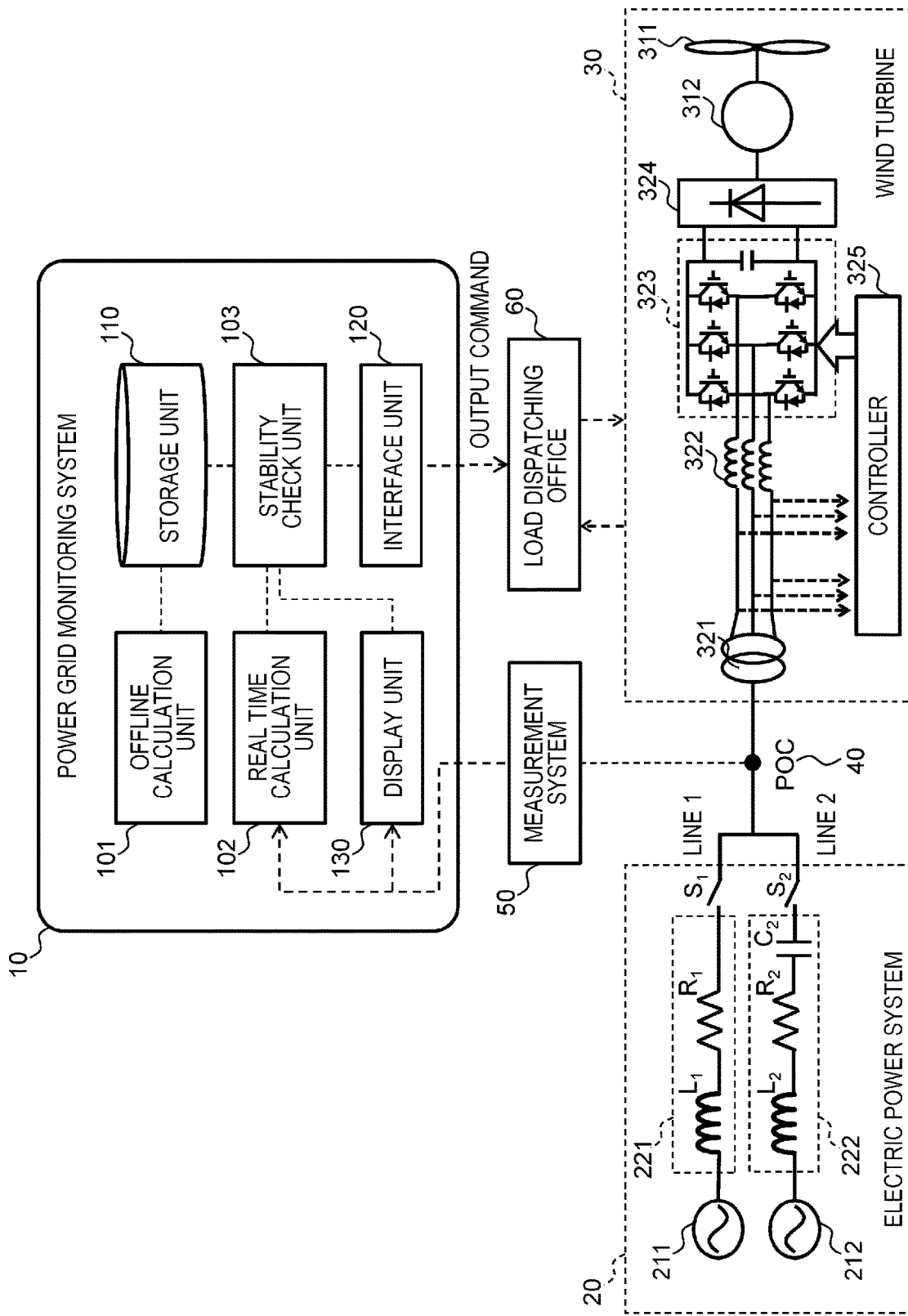
FIG. 15 is a schematic block diagram of a power grid monitoring system according to a fourth embodiment of the present invention.

FIG. 15 is a schematic block diagram of a power grid monitoring system 10 according to a fourth embodiment of the present invention. In the present embodiment, the electric power system 20 has a parallel configuration where two lines (hereinafter, referred to as "line 1" and "line 2") are connected in parallel to the POC 40. The line 1 includes a generator 211, a power grid impedance 221 including an inductor $L_1$ and a resistor $R_1$ connected in series, and a switch $S_1$. The line 2 includes a generator 212, a power grid impedance 222 including an inductor $L_2$, a resistor $R_2$, and a capacitor $C_2$, and a switch $S_2$. In other words, the generator 212 is connected to the POC 40 via the capacitor $C_2$, whereas the generator 211 is connected to the POC 40 without via a capacitor.

Note that the electric power system 20 may have another parallel configuration where three or more generators are connected in parallel to the PCS-based energy source 30 via respective power grid impedances at the POC 40. The power grid impedance may include an impedance element having any number of inductors, resistors, and/or capacitors. In addition, the capacitor $C_2$ may include a large number of capacitor elements connected in series and/or in parallel with each other.

Further, in the present embodiment, the PCS-based energy source 30 is configured as a wind turbine including blades 311 and a permanent magnet synchronous generator (PMSG) 312 constituting the PCS voltage source 31, and a transformer 321, a filter 322, an inverter 323, a rectifier 324, and a controller 325 constituting the PCS 32. Note that the configuration of the power grid monitoring system 10 is identical to the configuration of the first embodiment illustrated in FIG. 1. Further, one or more wind turbines each operate as the PCS-based energy source 30 and may be connected to the POC 40 as a wind farm including the wind turbines.

In the fourth embodiment, the measurement system 50 can provide the power grid monitoring system 10 with information about a network topology of the electric power system 20 in addition to the power flow data at the POC 40. The stability check unit 103 performs the stability check described in the first embodiment, and outputs a command to the controller 325 via the load dispatching office 60 in a case where LFO is detected. In response to this command, the controller 325 controls the inverter 323 and regulates the output power from the PCS-based energy source 30.

When a failure occurs and the switch $S_1$ opens at the line 1 of the electric power system 20, the wind turbine (PCS-based energy source 30) is radially connected with the capacitor $C_2$ via the switch $S_2$, and interacts with the capacitor $C_2$ to cause series resonance at the line 2. This changes the power grid impedance $Z_g(f)$. As a result, SSCI occurs and LFO of current and voltage is induced at the POC 40. Even in such a case, the stability check unit 103 can control the output power from the PCS-based energy source 30 by outputting a command, and thus the transfer function $Z_g(f)/Z_{PCS}(f)$ is maintained in the state identical to the state before the switch $S_1$ opens. This can promote the stabilization of the output power from the wind turbine.

Fifth Embodiment

Figure 16:
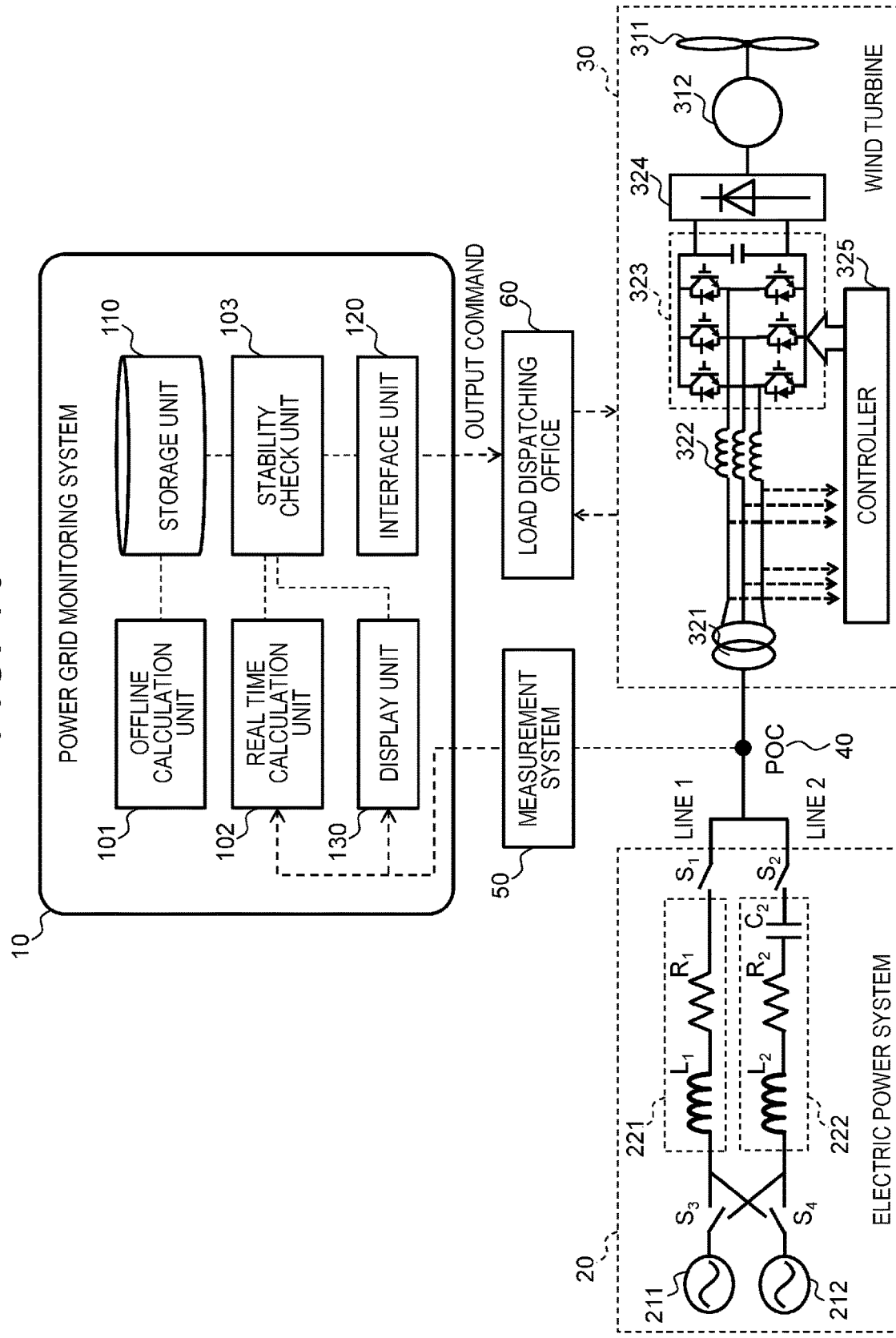
FIG. 16 is a schematic block diagram of a power grid monitoring system according to a fifth embodiment of the present invention.

FIG. 16 is a schematic block diagram of a power grid monitoring system 10 according to a fifth embodiment of the present invention. In the present embodiment, the electric power system 20 has a mesh pattern configuration where the generator 211 and the generator 212 are selectively connected to the line 1 and the line 2, which are two parallel lines connected respectively to the POC 40, via switches $S_3$ and $S_4$, respectively. As in the fourth embodiment described in the previous section, the line 1 includes the power grid impedance 221 including the inductor $L_1$ and resistor $R_1$ connected in series, and the switch $S_1$. The line 2 includes the power grid impedance 222 including the inductor $L_2$, the resistor $R_2$, and the capacitor $C_2$, and the switch $S_2$. In other words, the generators 211 and 212 are each connected to the POC 40 via or without the capacitor $C_2$.

Note that the electric power system 20 may have another mesh pattern configuration where three or more generators are connected in a mesh form to the PCS-based energy source 30 via respective power grid impedances at the POC 40. The power grid impedance may include an impedance element having any number of inductors, resistors, and/or capacitors. In addition, the capacitor $C_2$ may include multiple capacitor elements connected in series and/or in parallel with each other.

Note that as in the fourth embodiment, the PCS-based energy source 30 is configured as a wind turbine, and each of the one or more wind turbines operates as the PCS-based energy source 30 and may be connected to the POC 40 as a wind farm including the wind turbines. The configuration of the power grid monitoring system 10 is identical to the configuration in the first embodiment illustrated in FIG. 1.

According to the fourth and fifth embodiments of the present invention described above, as in the first embodiment, LFO can be monitored in real time for the PCS-based energy source 30 connected to the electric power system 20.

The above-described embodiments and modifications are merely examples, and the present: invention should not be considered limited by these details. Other implementations are within the scope of the present invention provided that the essential features of the present invention are retained.

REFERENCE SIGNS LIST 10, 10A, 10B power grid monitoring system
20 electric power system
21 generator
22 power grid impedance
30 PCS-based energy source
31 PCS voltage source 32 PCS (power control system)
40 POC (point of connection)
50 measurement system
60 load dispatching office
100 CPU
101 offline calculation unit
102 real time calculation unit
103 stability check unit
110 storage unit
120 interface unit
130 display unit

The invention claimed is:

1. A power grid monitoring system comprising:
a storage unit that stores power control system (PCS) impedance data indicative of a PCS impedance that is an impedance of a PCS-based energy source at a plurality of operation points, the PCS-based energy source being connected to an electric power system, the PCS-based energy source including a voltage source and a PCS that regulates power generated by the voltage source and supplies the power to the electric power system;
a real time calculation unit that calculates a power grid impedance based on a power flow measured at a point of connection where the PCS-based energy source and the electric power system are connected to each other, the power grid impedance being an impedance of the electric power system; and
a stability check unit that performs a stability check to detect low frequency oscillation (LFO) at the point of connection based on the PCS impedance data and the power grid impedance.

2. The power grid monitoring system according to claim 1,
wherein the storage unit stores the PCS impedance data indicative of the PCS impedance in a frequency region, and
wherein the real time calculation unit calculates the power grid impedance in a frequency region.

3. The power grid monitoring system according to claim 2,
wherein the stability check unit creates a Bode diagram including a gain and a phase angle of a transfer function between the PCS-based energy source and the electric power system at the point of connection using the PCS impedance data and the power grid impedance in the frequency region for each of the plurality of operation points, and
wherein the stability check unit determines whether the LFO is detected based on the Bode diagram.

4. The power grid monitoring system according to claim 1, further comprising an offline calculation unit that calculates the impedance of the PCS-based energy source,
wherein the storage unit stores the PCS impedance data generated based on the impedance of the PCS-based energy source calculated by the offline calculation unit.

5. The power grid monitoring system according to claim 1, wherein the stability check unit outputs a command for changing an operation state of the PCS-based energy source from a current operation point to another operation point among the plurality of operation points in a case where the LFO is detected for the current operation point.

6. The power grid monitoring system according to claim 1, wherein the electric power system has a parallel configuration where a plurality of generators is connected in parallel to the PCS-based energy source via respective impedance elements.

7. The power grid monitoring system according to claim 6, wherein the impedance elements include capacitors, and
wherein the plurality of generators includes a first generator connected via the capacitor and a second generator connected without the capacitor.

8. The power grid monitoring system according to claim 7, wherein the capacitors each include a plurality of capacitor elements connected in series and/or in parallel.

9. The power grid monitoring system according to claim 1, wherein the electric power system has a mesh configuration where a plurality of generators is connected in a mesh form to the PCS-based energy source via respective impedance elements.

10. The power grid monitoring system according to claim 1, wherein the PCS-based energy source is a wind farm including one or more wind turbines.

11. The power grid monitoring system according to claim 10, wherein each of the wind turbines is connected to the electric power system at the point of connection via the PCS including an inverter, a transformer, and a filter.

12. A power grid monitoring method comprising:
storing power control system (PCS) impedance data indicative of a PCS impedance that is an impedance of a PCS-based energy source at a plurality of operation points, the PCS-based energy source being connected to an electric power system, the PCS-based energy source including a voltage source and a PCS that regulates power generated by the voltage source and supplies the power to the electric power system,
calculating a power grid impedance based on a power flow measured at a point of connection where the PCS-based energy source and the electric power system are connected to each other, the power grid impedance being an impedance of the electric power system; and
performing a stability check to detect low frequency oscillation (LFO) at the point of connection based on the PCS impedance data and the power grid impedance.

* * * * *